Patented June 12, 1951

2,556,541

UNITED STATES PATENT OFFICE 2,556,541

DEFLUORINATION OF PHOSPHATE ROCKS

Clinton A. Hollingsworth, Lakeland, Fla., assignor to Coronet Phosphate Company, New York, N. Y., a corporation of New York No Drawing. Application January 8, 1949, Serial No. 69,985

12 Claims. (Cl. 71—44)

This invention relates to the defluorination of natural phosphate materials, and has for its object the provision of an improved method of defluorinating such materials by calcination.

The defluorination of phosphate rock by calcination, especially in rotary kilns, has been extensively studied and investigated by many skilled workers in the art, but no entirely satisfactory commercial process has yet resulted. The principal difficulty encountered with most rocks arises from the fact that the temperature required for the removal of fluorine is so near the fusion temperature of the rock that objectionable fusion or sintering takes place before the removal of fluorine to the desired extent is effected. Thus, since the optimum defluorinating temperature is usually just below that at which the rock fuses, it is not practical to operate at this temperature unless some means is provided to prevent fusion, because at times the operating temperature (particularly in a rotary kiln) will inadvertently rise above the fusion point. It has long been recognized that silica and water vapor aid defluorination, but silica in excess of about 4% and up to about 30% lowers the fusion temperature of the calcining charge. It has further been recognized that the admixture of phosphoric acid to the rock lowers the temperature at which the fluorine can be satisfactorily removed, but the fertilizer availability of the phosphate in the resulting calcine is too low for commercial use, and cannot be raised by heating to a higher temperature without fusing the charge.

In my application for Letters Patent of the United States Serial No. 780,747, filed October 18, 1947, the aforementioned difficulties are overcome in defluorinating a mixture of phosphate rock and phosphoric acid by carrying out the calcination in two stages, the first stage being carried out at a relatively low temperature but adequate to remove a substantial part of the fluorine, and the second stage being carried out at a sufficiently high temperature to impart high fertilizer availability to the phosphate, such high temperature being made possible without fusion of the charge by chemically balancing the silica, lime and phosphorus pentoxide contents of the charge to theoretically form tricalcium phosphate and dicalcium silicate. While this process gives excellent results in practice, it involves a two-stage or double calcination, which increases the over-all cost of the defluorination treatment.

I have now discovered that a mixture of phosphate rock and phosphoric acid can be satisfactorily defluorinated at relatively high temperature in a single pass through a rotary kiln, or other suitable calcining apparatus, if an atmosphere of powdered or finely divided lime is maintained about the charge in conjunction with the customary atmosphere of water vapor. The contemplated lime atmosphere is most conveniently maintained by blowing finely divided limestone into the hot or calcine-discharge end of the rotary kiln. Based on these discoveries, the present invention involves mixing the rock with phosphoric acid in amount of at least 10% based on the combined weight of rock and acid, and calcining the resulting mixture in an atmosphere containing finely divided lime and water vapor at a temperature of at least 2500° F. until the residual fluorine is less than 1 part per 40 parts of phosphorus and the calcined phosphate product has high fertilizer availability.

In carrying out the invention, the phosphate rock is first conditioned by mixing it with phosphoric acid. The rock may be relatively coarse, e. g. an unground table type flotation concentrate minus 8 mesh (Standard Tyler screen) and mostly on 65 mesh or a combined table type and froth flotation concentrate mostly minus 20 mesh and mostly on 150 mesh, or it may be ground or finely divided, e. g. minus 65 mesh and at least 65% through 200 mesh such as a finely ground rock or concentrate. Enough phosphoric acid should be used to effectively aid and promote defluorination, and at least 10% acid (calculated as $H_3PO_4$) based on the combined weight of rock and acid is usually required to this end. The larger the proportion of acid to rock, the lower will be the temperature at which the fluorine can be substantially eliminated. On the other hand, as the ratio of acid to rock is increased, the temperature at which the acid-rock mixture tends to fuse is lowered. Otherwise, acid in excess of the ratio of 1 part to 9 parts of rock does not critically affect the operation, and the acid may range from this ratio up to as high as in triple superphosphate. However, from a cost and operating standpoint, the preferred amount of acid is from 10 to 25% based on the combined weight of rock and acid; 12 to 20% of acid on that basis generally giving very satisfactory results in practice with rocks containing 3 or more per cent fluorine and having a $P_2O_5$ content of 30 to 40%. Roughly speaking, this preferred amount of acid is about ½ part by weight for each part by weight of $P_2O_5$ in the rock.

The acid, in the form of an aqueous solution of suitable concentration, is intimately mixed with the rock in a clay mill, pug mill or any other suitable apparatus for handling dough-like mixtures, when the mixture is delivered in a practically dry state to the calcining apparatus. When the mixture is delivered to the calcining apparatus in the form of an aqueous slurry, conventional slurry mixing equipment may be used for mixing the acid and rock.

The reactions between the rock and acid should proceed as near as possible to completion prior to calcination. Loss of $P_2O_5$ is likely to result when an incompletely reacted mixture is subjected to heat-treatment. Factors that influence the reaction rate are the strength of the acid, the moisture (water) content of the rock, and the temperature and duration of conditioning. The more concentrated the acid, the more rapidly does the reaction proceed to completion. On the other hand, sufficient moisture should be present to permit efficient mixing. The effective strength of the acid is affected, i. e. diluted, by the moisture content of the rock. In the case of unground flotation concentrates, customarily containing 10 to 15% water, this is important because if the added acid is too dilute, the acid (further diluted by the water in the concentrates) does not react with the relatively coarse rock particles in a reasonable time at normal temperatures. Heating and ageing of the mixture promote the reaction rate and hence shorten the necessary period of conditioning. Depending upon the foregoing considerations, any appropriate strength or concentration of acid (i. e. $H_3PO_4$) in water may be used, 25 to 75% acid being generally available and suitable for the purposes of the invention.

The larger the proportion of phosphoric acid to rock, the lower will be the temperature at which the fluorine can be substantially eliminated. However, as the proportion of acid is increased above 25% by weight, more lime must be retained by and reacted with the charge to make it sufficiently refractory to withstand without fusion the high ultimate calcining temperature required for imparting satisfactory fertilizer availability to the phosphate. For practical reasons, therefore, I recommend from 10 to 25%, and preferably about 12 to 20%, by weight of acid ($H_3PO_4$) based on the combined weight of acid and rock. On the other hand, the lime atmosphere of the invention is of advantage in defluorinating by calcination triple superphosphate in which such an amount of phosphoric acid has been mixed with the rock that the resulting mixture customarily contains about 48% $P_2O_5$.

Calcination is most conveniently carried out in a rotary kiln, although other types of calcining equipment may be used. In whatever calcining apparatus employed, the hot charge mixture is contacted with finely divided lime, suspended in the atmosphere surrounding and contacting the charge, so that a contemplated amount of lime is deposited upon and retained by the charge. In accordance with a preferred practice of the invention, powdered or finely divided limestone is blown into the front or firing end of the kiln. At the prevailing high temperature, the relatively small particles of limestone are promptly decarbonated in situ, and the resulting small particles of lime are dispersed in and carried by the gaseous stream through the kiln counter-current to the charge being calcined. Calcination is conducted in the presence of water vapor, care being exercised to assure intimate and continuous association of water vapor with the entire body of the charge until substantially complete defluorination is effected. The calcining temperature should be sufficiently high to impart high fertilizer availability to the phosphate content of the calcined product, and to this end should in practice be at least 2500° F., and usually will be between 2600 and 2800° F. Calcination is carried out in the absence of substantial fusion or sintering of the charge mixture. A detention period of 10 to 20 minutes at the calcining temperature, e. g. the hot zone of a rotary kiln, is generally sufficient to substantially defluorinate the rock and impart high fertilizer availability to its phosphate content.

While the lime atmosphere contemplated by the invention may be provided and maintained in any appropriate manner, as for example by blowing finely divided or powdered lime into the hot end of the kiln, the preferred, most convenient and most effective practice is to blow finely divided or powdered limestone into the kiln. For optimum results, a high grade limestone is desirable, e. g. containing by analysis at least 50% CaO with an insignificant amount of silica, and relatively little iron and aluminum. The limestone should be finely ground, preferably with at least 65% through 200 mesh. The limestone is decarbonated at the high temperature prevailing within the hot end of the kiln, and the evolved carbon dioxide mixes with the gaseous product of the operation. Part of the freshly calcined lime is swept into contact with and deposited upon and retained by the charge, where it serves to make the charge more refractory, thus permitting higher calcining temperatures without fusion. That part of the freshly calcined lime which remains suspended in the gaseous atmosphere above the charge is available to react with and neutralize the fluorine evolved from the charge during defluorination. Thus, any tendency of the charge to soften or fuse at the contemplated high calcining temperature is overcome by an addition in situ of lime in such amount as to impart to the charge the required degree of refractoriness to withstand that temperature without fusing or softening or balling-up. The neutralization by the freshly calcined lime of the evolved fluorine (mostly in the form of hydrogen fluoride) minimizes the corrosive effects of the latter, and also, I believe, reduces any tendency of the evolved fluorine to condense on the relatively cold surface of the charge toward the rear or charging end of the kiln.

The amount of limestone blown into the kiln and retained by the charge undergoing calcination should be adequate to render the charge sufficiently refractory to withstand without substantial fusion the contemplated calcining temperature of at least 2500° F. and preferably higher, say 2600 to 2800° F. "Without substantial fusion" means in the absence of such fusion or sintering as to cause the charge to become sticky, in whole or in part, or tend to make it cling or stick to the wall of the calcining apparatus, or, in a rotary kiln, to ball-up and to fail to flow freely and easily through the kiln. The required amount of limestone will vary with different phosphate rocks and more particularly with the silica content of such rocks, customarily determined as insoluble matter (insol.). In practicing the invention, optimum results are obtained with phosphate rocks containing less than 4% of silica (insol.), although, as hereinafter explained, the invention may be successfully practiced with rocks having considerably more silica. Generally speaking the amount of limestone blown into the kiln in accordance with the invention will vary from 0.1 to 0.5 the amount by weight of the calcining charge. For example, where the charge is fed to the kiln at the rate of 200 pounds per hour, limestone may be blown into the kiln at the rate of 20 to 100 pounds per hour.

The admixture of phosphoric acid with most phosphate rocks will result in a mixture containing inadequate lime (CaO) to theoretically form tricalcium phosphate $(Ca_3(PO_4)_2)$ and dicalcium silicate $(Ca_2SiO_4)$ with all the phosphorus pentoxide $(P_2O_5)$ and silica $(SiO_2)$, respectively, in the mixture, and such an amount of limestone may advantageously be blown into the kiln as to insure the retention by the calcining charge of lime in about the amount required to make up that inadequacy or deficit. Obviously, the higher the silica content of the rock, the greater is the amount of limestone required for this purpose. For convenience, the lime over and above that required to form tricalcium phosphate may be called "excess" lime, and the amount of limestone blown into the kiln should generally be such that the ratio of "excess" lime to silica in the calcined product is approximately 2 to 1. Control and regulation of the limestone blown into the kiln can thus be effected in practice by periodic determinations of the "excess" lime and silica ratio. When too much limestone is blown into the kiln, defluorination and the fertilizer availability of the phosphate are adversely affected.

The precise action between the lime atmosphere and the calcining charge is not entirely understood, but it is believed to be both chemical and physical. Some of the lime deposited upon the individual particles or nodules of the charge appears to react chemically with compounds thereof to form other compounds that are more refractory and hence able to withstand without fusion a higher calcining temperature. Sometimes this reaction seems to be largely confined to and near the surface of the particle or nodule and sometimes it penetrates deeply into and even throughout the mass of the particle or nodule. It also appears that some of the lime may merely coat the surface of the particle or nodule and this lime coating acts to inhibit such sticking together of particles, aggregates and nodules as would "ball-up" the charge. Because of the analogous action of flour in preventing the sticking of dough, this surface coating action of lime has come to be called its "flour effect." It further appears that even where the action of the lime is confined to or near the surface of the particle or nodule, some chemical reaction also takes place between the lime, phosphorus pentoxide and silica resulting largely in the formation of tricalcium phosphate and dicalcium silicate. Thus, the center of such a nodule, after calcination, differs from the outer portion thereof and is very similar in structure to the product obtained by a direct heating of a similar nodule of the same rock-acid mixture. It therefore seems that the "flour effect" is not only physical but up to a point chemical in that it produces a refractory surface on the nodule which permits it to pass through the hot zone of the rotary kiln, or other calcining apparatus, at a temperature far above any which could be used without objectionable fusion were the lime not applied to the surface. Whatever the explanation of the action of the lime atmosphere, actual experience and practice has demonstrated that the lime atmosphere makes possible substantially complete defluorination with the production of a phosphate product of high fertilizer availability in a single pass through a rotary kiln without objectionable sintering or fusion of the charge.

When lime or limestone is blown into the firing end of the kiln, the major portion mixes with the charge in the hottest zone of the kiln by settling into contact with and by being readily retained by the hot and slightly tacky hot charge. The lighter particles of lime remain entrained in the gases passing through the kiln. Thus, there is progressively less settling of lime and mixing thereof with the charge from the hot or firing end of the kiln toward the feed end thereof. The inclusion of lime in the mixture of rock and acid raises the temperature at which fluorine is otherwise readily removed at temperatures below 2500° F. By blowing lime or limestone into the firing end of the kiln, fluorine is substantially eliminated before the charge of rock and acid progresses to a position in the kiln where such an amount of lime becomes mixed with the charge as to objectionably impede fluorine removal at temperatures below 2500° F. The rate of movement of the charge through the kiln is such that lime is available, in the lime atmosphere, for mixing with the charge in substantial quantities by the time the temperature of the progressively-moving charge approaches that at which fusion thereof, in the absence of lime, takes place, and the lime so mixed with the charge in the hot zone of the kiln raises the fusion point of the charge so that it passes through the hot zone at a temperature of 2600 to 2800° F. without substantial fusion. If the lime was included in the mixture of rock and acid, or was introduced at the feed end of the kiln, it would not only raise the temperature of substantial fluorine removal but would react with phosphoric acid to form tricalcium phosphate and to that extent phosphoric acid would be lost and unavailable to promote fluorine elimination.

While silica in excess of about 4% promotes defluorination, it also lowers the temperature at which the calcining charge tends to fuse. This undesirable effect of the silica can be compensated to some extent by regulating the "excess" lime and silica ratio as hereinabove described. However, even with such compensation, when the silica content of the rock exceeds about 6%, the calcining operation becomes more sensitive and critical, because of the tendency of the charge to fuse, and careful control of the temperature is necessary. On the other hand, the lime atmosphere of the invention makes it possible to defluorinate phosphate rocks containing silica considerably in excess of 6% by carefully controlling the calcining temperature.

The defluorinated phosphate product of the invention is available both as a plant fertilizer and as a mineral supplement in animal feed. The fertilizer availability of its phosphate content is high, that is its $P_2O_5$ solubility exceeds 85% as determined by the customary neutral ammonium citrate test, or alternatively by the 2% citric acid solubility test. Its fluorine content is less than 1 part per 40 parts of phosphorus, which is the present day trade requirement for use as a mineral supplement. With a $P_2O_5$ content of about 40%, the product may contain up to 0.4% fluorine and meet the requirements of a mineral supplement, but for optimum fertilizer availability the fluorine content of the product should be less than 0.2%.

The following examples illustrate the technical improvements resulting from the practice of the invention.

EXAMPLE 1

The phosphate rock was a relatively coarse flotation concentrate (from Florida rock) having the following chemical and screen analyses:

*Chemical analysis*

| $P_2O_5$ | Insol. | $Fe_2O_3$ | $Al_2O_3$ | CaO | $CO_2$ | Fluorine |
|---|---|---|---|---|---|---|
| Per cent 34.30 | Per cent 3.40 | Per cent 0.75 | Per cent 0.70 | Per cent 49.69 | Per cent 3.11 | Per cent 4.00 |

*Screen analysis*

| +20 mesh | −20+35 | −35+65 | −65+150 | −150 |
|---|---|---|---|---|
| Per cent 0.6 | Per cent 22.3 | Per cent 43.6 | Per cent 32.8 | Per cent 0.7 |

The unground concentrate was dried and mixed in a cement mixer with phosphoric acid (62.7% $H_3PO_4$) in the proportions by weight of 83.3% concentrate and 16.7% $H_3PO_4$. The resulting mixture was partially dried, crushed and screened to minus 6 mesh. Its chemical and screen analyses were:

*Chemical analysis (dry basis)*

| $P_2O_5$ | Insol. | $Fe_2O_3$ | $Al_2O_3$ | CaO | F |
|---|---|---|---|---|---|
| Per cent 40.57 | Per cent 2.40 | Per cent 1.43 | Per cent 0.95 | Per cent 40.15 | Per cent 3.44 |

*Screen analysis*

| +10 mesh | −10+20 | −20+35 | −35+65 | −65 |
|---|---|---|---|---|
| Per cent 8.0 | Per cent 24.4 | Per cent 32.9 | Per cent 26.7 | Per cent 8.0 |

As fed to the kiln, the feed contained 12% water ($H_2O$).

Calcination was carried out in a 3 by 40 foot rotary kiln, having a pitch of one-fourth inch per foot, lined with Lofero and Kromag brick, and fired by one Tate-Jones oil burner. Water was vaporized in the burner hood at the rate of 440 ml. per minute. Limestone was blown into the front or firing end of the kiln at the rate of 60 pounds per hour by means of a 2 inch blower. The limestone had the following chemical and screen analyses:

*Chemical analysis*

| $P_2O_5$ | Insol. | CaO | Fluorine |
|---|---|---|---|
| Per cent 4.40 | Per cent 0.92 | Per cent 53.12 | Per cent 0.53 |

*Screen analysis*

| +65 mesh | −65+100 | −100+200 | −200 |
|---|---|---|---|
| Per cent 1.8 | Per cent 9.2 | Per cent 17.1 | Per cent 71.9 |

The charge mixture of rock and phosphoric acid was fed to the kiln and flowed freely and easily therethrough, thereby evidencing the absence of substantial fusion. The following is a summary of the operating conditions:

| Pounds Per hour of— | | Kiln Speed, Sec./rev. | Rate of Travel, min./ft. | Temperature, Degrees F. | |
|---|---|---|---|---|---|
| Charge | Discharge | | | Hot zone | Feed End |
| 200 | 179 | 40 | 3 | 2,687 | 1,969 |

A composite sample of the calcined phosphate product of the run analyzed as follows:

| Product | Wt. Per Cent | $P_2O_5$ | $SiO_2$ | CaO | F | $P_2O_5$ availables | | |
|---|---|---|---|---|---|---|---|---|
| | | | | | | 0.4% HCl | 2% Citric | Citrate |
| +0.3 mesh | 4.7 | 42.47 | 3.64 | 50.53 | .05 | 42.14 | 39.74 | 38.67 |
| −0.3 mesh | 95.3 | 40.52 | 3.56 | 53.10 | .03 | 40.14 | 38.50 | 37.62 |
| | 100 | 40.61 | 3.56 | 52.98 | .03 | 40.23 | 38.56 | 37.67 |

EXAMPLE 2

The feed (mixture of rock and acid) was made up in substantially the same manner and had approximately the same chemical analysis as in Example 1. The kiln speed was 30 seconds per revolution, and the rates of feed were: charge 367, discharge 267, limestone 82 pounds per hour. The temperature in the hot zone of the kiln averaged about 2700° F. A composite sample of the calcined phosphate product of the run analyzed as follows:

| Product | Wt. Per Cent | $P_2O_5$ | $SiO_2$ | CaO | F | $P_2O_5$ availables | | |
|---|---|---|---|---|---|---|---|---|
| | | | | | | 0.4% HCl | 2% Citric | Citrate |
| +0.3 mesh | 10.5 | 42.35 | 2.30 | 50.83 | .09 | 41.76 | 36.66 | 33.55 |
| −0.3 mesh | 89.5 | 39.28 | 3.00 | 53.66 | .15 | 38.94 | 34.86 | 33.96 |
| | 100.0 | 39.60 | 2.93 | 53.36 | .14 | 39.24 | 35.05 | 33.92 |

It will be noted that even with the substantially higher charge and discharge rates, compared with Example 1, the product was substantially defluorinated and its phosphate content possessed satisfactory availability as a mineral supplement and as a fertilizer. During one hour of this run, the discharge averaged 322 pounds per hour and the fluorine content of the discharged product averaged 0.17%. During another hour of the run, when the discharge averaged 270 pounds per hour, the fluorine in the discharged product averaged 0.07%. The charge flowed freely through the kiln throughout the run. At times, the hot zone temperature exceeded 2750° F., and some balling-up of the charge then took place, but the product continued to discharge satisfactorily and the residual fluorine was under 0.2%.

At the end of the run, blowing-in of limestone was stopped and the hot zone temperature of the kiln was lowered to avoid any possible balling-up of the charge in the absence of the lime atmosphere. From the following analyses of samples taken at subsequent intervals it will be noted that 15 minutes after the blowing-in of limestone was stopped, the $P_2O_5$ content of the calcined product increased from 39.60% to 42.57% and the lime content decreased from 53.36% to 50.0%, thus indicating that in the preceding run with the lime atmosphere, most of the lime was picked up by the charge in the hot zone of the kiln. At the lower calcining temperatures, in the absence of the lime atmospheres, defluorination was unsatisfactory.

| Minutes after Stopping limestone | Hot zone temp., Degrees F. | $P_2O_5$ | $SiO_2$ | CaO | F |
|---|---|---|---|---|---|
| 15 | 2,600 | 42.57 | 2.20 | 50.0 | .10 |
| 45 | 2,420 | 42.78 | 3.58 | 48.6 | .51 |
| 75 | 2,370 | 43.02 | 3.20 | 49.3 | .41 |

EXAMPLE 3

The phosphate rock, a coarse flotation concentrate (from Florida rock), was ground to 68.2% through 200 mesh. Its chemical analysis was as follows:

| $P_2O_5$ | Insol. | $Fe_2O_3$ | $Al_2O_3$ | CaO | $CO_2$ | F |
|---|---|---|---|---|---|---|
| 34.40 | 3.61 | 0.83 | 0.65 | 49.35 | 3.45 | 3.68 |

The ground rock was mixed with phosphoric acid in the proportion of 85.3% by weight of rock and 14.7% by weight of $H_3PO_4$, and the mixture was made into an aqueous slurry containing approximately 30% water. The slurry was nodulized, and incidentally defluorinated to some extent, by passage through a rotary kiln at a nodulizing temperature. The resulting nodules, crushed and screened to mostly through 3 mesh, were then calcined in a rotary kiln with an atmosphere of lime and water vapor, 440 ml. of water being vaporized per minute in the burner hood. The screen analysis of the nodules as fed to the kiln was as follows:

| +3 mesh | −3+6 | −6+10 | −10+20 | −20 |
|---|---|---|---|---|
| Per cent 3.5 | Per cent 42.5 | Per cent 39.3 | Per cent 10.8 | Per cent 3.9 |

The following is a summary of the operating conditions

| | Pounds Per hour of— | | | Kiln Speed, Sec./rev. | Hot zone Temperature, Degrees F. |
|---|---|---|---|---|---|
| | Charge | Discharge | Limestone | | |
| Nodulizing | 800 | 500 | -------- | 13 | 2,212 |
| Calcining | 200 | 181 | 80 | 40 | 2,682 |

Composite samples of the various feeds and products of the run gave the following analyses:

| | $P_2O_5$ | Insol. or $SiO_2$ | CaO | F | $P_2O_5$ availables | | |
|---|---|---|---|---|---|---|---|
| | | | | | 0.4% HCl | 2% Citric | Citrate |
| Slurry | 40.30 | 3.06 | 43.13 | 3.52 | | | |
| Nodules | 43.89 | 3.35 | 47.47 | 1.55 | | | |
| Calcine | 40.46 | 3.26 | 51.31 | .14 | 40.24 | 37.19 | 35.25 |

At times when the hot zone temperature exceeded 2700° F., there was a tendency for the nodules, particularly the larger ones, to stick together in a cluster which is characterized as "graping," but the charge progressed smoothly through the kiln, and satisfactory defluorination was effected. During one stage of the run, the hot zone temperature was intentionally increased well above 2700° F., with the result that there was considerable "graping," but the calcine continued to discharge satisfactorily, and the "graped" product was substantially defluorinated and its $P_2O_5$ availables were satisfactory both as a mineral supplement and as a fertilizer. By crushing the nodules to mostly through 6 mesh, better lime reaction is obtained, and "graping" is much less conspicuous because of the more effective action of the lime atmosphere.

EXAMPLE 4

The feed to the kiln was commercial triple superphosphate. It was nodulized, crushed and screened to mostly through 6 mesh. Calcination may be carried out either in a very long rotary kiln or with two or more passes through a shorter rotary kiln, at an ultimate hot zone temperature of approximately 2700° F. Because of the low fusion temperature, the temperature at the rear or feed end of the long kiln should be comparatively low, e. g. around 200° F., and the temperature should be increased very gradually so that sufficient lime can be picked up by the charge to prevent fusion. If the kiln temperature (from rear end to hot zone) is increased too rapidly the whole charge will become sticky and unmanageable. Instead of calcining in a very long kiln with a slowly increasing temperature gradient from the rear end to the hot zone, calcination may be carried out in two or more passes through a shorter kiln, with progressively lower fluorines and increasing hot zone temperatures in succeeding passes. With a residual fluorine content of 0.1 or less, the defluorinated triple superphosphate can be calcined without fusion at 2800° F. and higher in the lime atmosphere of the invention, if necessary to assure high fertilizer availability of the phosphate. In this particular run, the ratio of lime blown in to feed was about 0.5. Water was vaporized as usual in the burner hood. The chemical analyses of the feed and calcined product were as follows:

| | $P_2O_5$ | Insol. $SiO_2$ | CaO | F | $P_2O_5$ Availables | | |
|---|---|---|---|---|---|---|---|
| | | | | | .4% HCl | 2% Citric | Citrate |
| Feed | 47.48 | 2.98 | 18.82 | 2.25 | | | |
| Calcine | 38.82 | 3.60 | 52.22 | .02 | 38.82 | 34.52 | 32.54 |

The foregoing example demonstrates the practicability of defluorinating triple superphosphate by calcination in an atmosphere containing lime and water vapor without serious fusion of the charge. The phosphate in triple superphosphate is of high fertilizer availability, and the purpose of defluorination is to produce a phosphate product of low fluorine content and hence suitable as a mineral supplement. In the course of calcination, the fertilizer availability of the phosphate is greatly lowered, and hence the necessity of heating the substantially defluorinated material to a sufficiently high temperature to convert the phosphate back to a high degree of solubility for fertilizer purposes. The lime atmosphere of the invention enables the material to withstand without fusion this required high calcining temperature, but the lime deposited on and taken up by the charge lowers the grade of the product from around 48% $P_2O_5$ to 38–40% $P_2O_5$. For these reasons, it is generally more economic and better practice to mix with the phosphate rock not more than about 25% by weight of phosphoric acid ($H_3PO_4$) based on the combined weight of rock and acid.

Calcination of rock-acid mixtures in the lime atmosphere of the invention have been carried out with mixtures containing as little as 6% acid up to triple superphosphate. In all cases the lime atmosphere was found beneficial in that it imparted greater refractoriness to the charge. With phosphate rocks of approximately the composition of those used in the foregoing examples, the preferred range of phosphoric acid is from about 12 to about 20%. When operating within this preferred acid range, the size of the discharge does not affect fertilizer availability to any great extent, except that large balls should be avoided. When the acid is outside the preferred range, better results appear to be obtained by keeping the kiln charge in a relatively fine state of subdivision. Below the preferred acid range, a fine kiln charge greatly aids defluorination, and above the preferred acid range the fine kiln charge aids attainment of high fertilizer availability. In all cases, the longer the kiln charge remains in the hot zone of the kiln, the higher will be the fertilizer availability; and especially is this true when operating outside the preferred acid range.

Where the appended claims call for introducing lime into the firing end of the kiln, the term "lime" is used to include limestone which will decompose at the temperature prevailing in the kiln to yield lime.

I claim:

1. The improvement in defluorinating phosphate rock and increasing its fertilizer availability which comprises forming a mixture of phosphate rock and phosphoric acid in such relative amounts as to produce a mixture incapable of being calcined at a temperature of 2500° F. without substantial fusion, progressively moving the mixture through a kiln from one end thereof in the presence of water vapor and progressively raising the temperature thereof to at least 2500° F., adding lime to the progressively-moving mixture in amount sufficient to raise the fusion point of the mixture to a temperature above 2500° F., said lime being added by blowing it in finely-divided form into the other end of the kiln, whereby lime is deposited onto and retained by the mixture in progressively less amounts towards said first-mentioned end of the kiln, and causing the mixture to move through the kiln at a rate such that fluorine is substantially liberated before the amount of lime taken up by the mixture is sufficient to objectionably impede fluorine elimination.

2. The improvement in defluorinating phosphate rock and increasing its fertilizer availability as defined in claim 1 in which the lime is added in the form of limestone, and the amount of limestone blown into the kiln is from 0.1% to 0.5% by weight of the combined weight of phosphate rock and phosphoric acid fed to the kiln.

3. The improvement in defluorinating phosphate rock and increasing its fertilizer availability as defined in claim 1 in which the amount of limestone blown into the kiln is such as to have a lime content in excess of that sufficient theoretically to form tricalcium phosphate with all the phosphorous pentoxide by an amount equal approximately to twice that necessary to form dicalcium silicate with all silica present.

4. The improvement in defluorinating phosphate rock and increasing its fertilizer availability as defined in claim 1 in which the amount of phosphoric acid initially in the mixture is equal to at least 10% of the combined weight of the rock and acid.

5. The improvement in defluorinating phosphate rock and increasing its fertilizer availability as defined in claim 1 in which the defluorination of the phosphate rock is such that the calcined product contains less than one part of fluorine per forty parts of phosphorous.

6. The improvement in defluorinating phosphate rock and increasing its fertilizer availability as defined in claim 1 in which the amount of phosphoric acid initially in the mixture is equal to between 10% and 25% of the combined weight of the rock and acid and the mixture contains less than 6% of silica.

7. The improvement in defluorinating phosphate rock and increasing its fertilizer availability as defined in claim 1 in which the amount of phosphoric acid initially in the mixture is equal to between 12% and 20% of the combined weight of the rock and acid and the mixture contains less than 4% of silica.

8. The improvement in defluorinating phosphate rock and increasing its fertilizer availability as defined in claim 1 in which the final calcining temperature is between 2600° F. and 2800° F.

9. The improvement in defluorinating phosphate rock and increasing its fertilizer availability which comprises forming a mixture of phosphate rock and phosphoric acid in such relative amounts as to produce a mixture incapable of being calcined at a temperature of 2500° F. without substantial fusion, progressively moving the mixture through a kiln from one end thereof in the presence of water vapor and progressively raising the temperature thereof to at least 2500° F., and blowing finely divided lime into the other end of the kiln where it mixes with the mixture after fluorine has been substantially liberated and before any substantial fusion of the mixture takes place, the amount of lime blown into the kiln being sufficient to raise the fusion point of the mixture to above the maximum temperature which the mixture reaches in passing through the kiln, whereby the mixture passes through the kiln without substantial fusion.

10. The improvement in defluorinating phosphate rock and increasing its fertilizer availability as defined in claim 9 in which the amount of phosphoric acid initially in the mixture is equal to at least 10% of the combined weight of the rock and acid, and in which defluorination of the phosphate rock is such that the calcined product contains less than one part of fluorine per forty parts of phosphorous.

11. The improvement in defluorinating phosphate rock and increasing its fertilizer availability as defined in claim 9 in which the amount of phosphoric acid initially in the mixture is equal to between 10% and 25% of the combined weight of the rock and acid.

12. The improvement in defluorinating phosphate rock and increasing its fertilizer availability which comprises forming a mixture of phosphate rock and at least 10% of phosphoric acid based on the combined weight of the rock and acid to produce a mixture incapable of being calcined at a temperature of 2500° F. without substantial fusion, progressively moving the mixture through a kiln from one end thereof in the presence of water vapor and progressively raising the temperature thereof to at least 2500° F., blowing finely-divided lime into the other end of the kiln, whereby lime is deposited onto and retained by the mixture in progressively less amounts towards said first-mentioned end of the kiln, and causing the mixture to move through the kiln at a rate such that fluorine is substantially liberated therefrom before a substantial amount of lime is added thereto, but at such rate that a substantial amount of lime is mixed with the mixture before it is raised to a temperature at which fusion thereof otherwise would begin, the defluorination of the phosphate rock being such that the calcined product contains less than one part of fluorine per forty parts of phosphorous.

CLINTON A. HOLLINGSWORTH.

REFERENCES CITED

The following references are of record in the file of this patent:

UNITED STATES PATENTS

| Number | Name | Date |
|---|---|---|
| 1,174,176 | Newberry et al. | Mar. 7, 1916 |
| 2,093,176 | Tromel | Sept. 14, 1937 |
| 2,337,498 | Ritter et al. | Dec. 21, 1943 |
| 2,442,929 | Butt | June 8, 1948 |